(12) United States Patent
Kumar et al.

(10) Patent No.: US 10,645,093 B2
(45) Date of Patent: May 5, 2020

(54) REDUCTION IN SECURE PROTOCOL OVERHEAD WHEN TRANSFERRING PACKETS BETWEEN HOSTS

(71) Applicant: NICIRA, INC., Palo Alto, CA (US)

(72) Inventors: Vasantha Kumar, Pune (IN); Vaibhav Rekhate, Pune (IN); Nidhi Sharma, Pune (IN); Sriram Gopalakrishnan, Pune (IN)

(73) Assignee: Nicira, Inc., Palo Alto, CA (US)

( * ) Notice: Subject to any disclaimer, the term of this patent is extended or adjusted under 35 U.S.C. 154(b) by 224 days.

(21) Appl. No.: 15/683,799

(22) Filed: Aug. 23, 2017

(65) Prior Publication Data
US 2019/0020662 A1 Jan. 17, 2019

(30) Foreign Application Priority Data

Jul. 11, 2017 (IN) .............................. 201741024325

(51) Int. Cl.
*H04L 29/06* (2006.01)
(52) U.S. Cl.
CPC .......... *H04L 63/12* (2013.01); *H04L 63/0272* (2013.01); *H04L 63/164* (2013.01); *H04L 63/166* (2013.01); *H04L 63/205* (2013.01)
(58) Field of Classification Search
CPC ....................................................... H04L 63/12
See application file for complete search history.

(56) References Cited

U.S. PATENT DOCUMENTS

| | | | |
|---|---|---|---|
| 2005/0195753 A1* | 9/2005 | Chaskar ................ | H04W 8/005 370/254 |
| 2005/0232161 A1* | 10/2005 | Maufer ................. | H04L 63/062 370/252 |
| 2006/0245417 A1* | 11/2006 | Conner ................. | H04L 1/0041 370/352 |
| 2012/0246522 A1* | 9/2012 | Frayssignes ........ | G06F 11/0739 714/48 |
| 2015/0055499 A1* | 2/2015 | Zheng .................... | H04L 47/56 370/252 |
| 2015/0071301 A1* | 3/2015 | Dalal .................. | H04L 12/4641 370/419 |
| 2016/0277245 A1* | 9/2016 | Wei ..................... | H04L 12/6418 |
| 2019/0020662 A1* | 1/2019 | Kumar .................... | H04L 63/12 |

OTHER PUBLICATIONS

NPL Search (Google Scholar) (Year: 2019).*

* cited by examiner

*Primary Examiner* — Samson B Lemma
*Assistant Examiner* — Richard W Cruz-Franqui (57) ABSTRACT

The technology disclosed herein enables reduction of secure protocol overhead when transferring packets between guest elements on different hosts. In a particular embodiment, the method provides, in a first virtual network interface of a first guest element, receiving one or more first packets from a first guest element directed to a second guest element. In response to determining that the first packets will be encapsulated in a secure protocol having a first integrity check procedure provided for by the secure protocol, the method provides refraining to perform a transmit-side portion of a second integrity check procedure on the first packets as provided for by a transport protocol. The method further provides passing the first packets to a first host of the first virtual network interface in the transport protocol.

20 Claims, 6 Drawing Sheets

REDUCTION IN SECURE PROTOCOL OVERHEAD WHEN TRANSFERRING PACKETS BETWEEN HOSTS

RELATED APPLICATIONS

Benefit is claimed under 35 U.S.C. 119(a)-(d) to Foreign Application Serial No. 201741024325 filed in India entitled "REDUCTION IN SECURE PROTOCOL OVERHEAD WHEN TRANSFERRING PACKETS BETWEEN HOSTS", on Jul. 11, 2017, by NICIRA, INC., which is herein incorporated in its entirety by reference for all purposes.

TECHNICAL BACKGROUND

The security of data is a very important consideration when operating data centers. Almost every user, from large corporate or governmental entities to an individual consumer, has an expectation that their data handled by a data center in a secure manner. To that end, numerous secure protocols have been created to ensure that data security is maintained. In situations where data is being transferred between data center computing systems, a data center may employ a secure protocol when transferring data, such as Internet Protocol Security (IPsec) or Secure Sockets Layer (SSL), to ensure data cannot be intercepted and read by a system other than the system for which the data is intended.

The above mentioned secure protocols may be used as a security measure in addition to one or more security measures already provided by a transport protocol, such as Transmission Control Protocol (TCP) or User Datagram Protocol (UDP). In physical computing environments, the processing resources consumed when securing data at multiple layers during transfer (e.g., using IPsec and TCP checksum) may be minimized by offloading at least the transport protocol's security measures to a network interface. However, in virtual computing environments, the network interface is typically virtualized and such offloading would still rely on the processing resources of the host computing system that provides the virtualized interface.

SUMMARY

The technology disclosed herein enables reduction of secure protocol overhead when transferring packets between guest elements on different hosts. In a particular embodiment, the method provides, in a first virtual network interface of a first guest element, receiving one or more first packets from a first guest element directed to a second guest element. In response to determining that the first packets will be encapsulated in a secure protocol having a first integrity check procedure provided for by the secure protocol, the method provides refraining to perform a transmit-side portion of a second integrity check procedure on the first packets as provided for by a transport protocol. The method further provides passing the first packets to a first host of the first virtual network interface in the transport protocol.

In some embodiments, the method provides, in the first host, encapsulating the first packets in the secure protocol and performing a transmit-side portion of the first integrity check procedure.

In some embodiments, the method provides, in a second virtual network interface of the second guest element, receiving the first packets from a second host of the second virtual network interface. In response to determining that the first packets were encapsulated in the secure protocol, the method provides refraining to perform a receiver-side portion of the second integrity check procedure and passing the first communications to the second guest element. In these embodiments, the method may provide, in the second host, un-encapsulating the first packets and performing the receiver-side portion of the first integrity check procedure and passing the first packets to the second virtual network interface when the receiver-side portion of the first integrity check procedure verifies the first packets. Also in these embodiments, refraining to perform a receiver-side portion of the second integrity check procedure may include inserting a non-zero placeholder value into a checksum field of the first packets in the transport protocol and indicating to the second guest element that the receiver-side portion of the second integrity check procedure verified the first packets. In these cases, the second integrity check procedure may be a Cyclic Redundancy Check (CRC) procedure and the checksum field may be a field designated for a CRC. In some cases, the second guest element receives the first packets from the second virtual network interface and handles the first packets as though the first packets were verified by the receiver-side portion of the second integrity check procedure.

In some embodiments, the method provides, in the first virtual network interface, receiving one or more second packets from the first guest element. In response to determining that the second packets will not be encapsulated in the secure protocol, the method provides performing the transmit-side portion of the second integrity check procedure on the second packets and passing the second packets to the first host in the transport protocol.

In some embodiments, the secure protocol comprises one protocol of the group including Secure Sockets Layer (SSL) and Internet Protocol Security (IPSec) and the transport protocol comprises one protocol of the group including Transmission Control Protocol (TCP) and User Datagram Protocol.

In another embodiment, a system is provided having one or more computer readable storage media and a processing system operatively coupled with the one or more computer readable storage media. Program instructions stored on the one or more computer readable storage media, when read and executed by the processing system, direct the processing system to provide a first virtual network interface of a first guest element and provide a first host of the first virtual network interface. The program instructions further direct the processing system to, in the first virtual network interface, receive one or more first packets from a first guest element directed to a second guest element. In response to determining that the first packets will be encapsulated in a secure protocol having a first integrity check procedure provided for by the secure protocol, the program instructions direct the processing system to refrain to perform a transmit-side portion of a second integrity check procedure on the first packets as provided for by a transport protocol and pass the first packets to the first host in the transport protocol.

In yet another embodiment, a system is provided also having one or more computer readable storage media and a processing system operatively coupled with the one or more computer readable storage media. Program instructions stored on the one or more computer readable storage media, when read and executed by the processing system, direct the processing system to provide a second virtual network interface of a second guest element and provide a second host of the second virtual network interface. The program instructions further direct the processing system to, in the first virtual network interface, receive one or more first packets from the second host. In response to determining that the first packets were encapsulated in a secure protocol having a first integrity check procedure provided for by the secure protocol, the program instructions direct the processing system to refrain to perform a receiver-side portion of a second integrity check procedure on the first packets as provided for by a transport protocol and passing the first communications to the second guest element.

DETAILED DESCRIPTION

The implementations described herein leverage the nature of virtual computing elements to refrain from performing a data integrity check procedure provided by a transport protocol when the integrity check of another, more secure, protocol is also being used on packets being transferred. Specifically, if a more secure protocol is going to be used before the packets leave the host to ensure the integrity of the data packets, the integrity check of the transport protocol becomes redundant. Any processing resources used to perform that transport layer integrity check are therefore used without providing a corresponding benefit. While the processing resources needed to perform the integrity check can be offloaded to network interface hardware in physical computing systems, such offloading does not have the same benefit when performed by virtual computing elements. Instead, when a virtualized guest computing element offloads integrity check functions, the guest computing element's network interface is also being virtualized by a host computing system using the physical processing resources intended to be conserved by the offloading. Given the flexibility of guest computing elements and their reliance on host hardware and software to operate, the hosts of the implementations below refrain from performing the integrity checks required by the transport protocol in order to conserve processing resources while maintaining security using an additional secure protocol.

Figure 1:
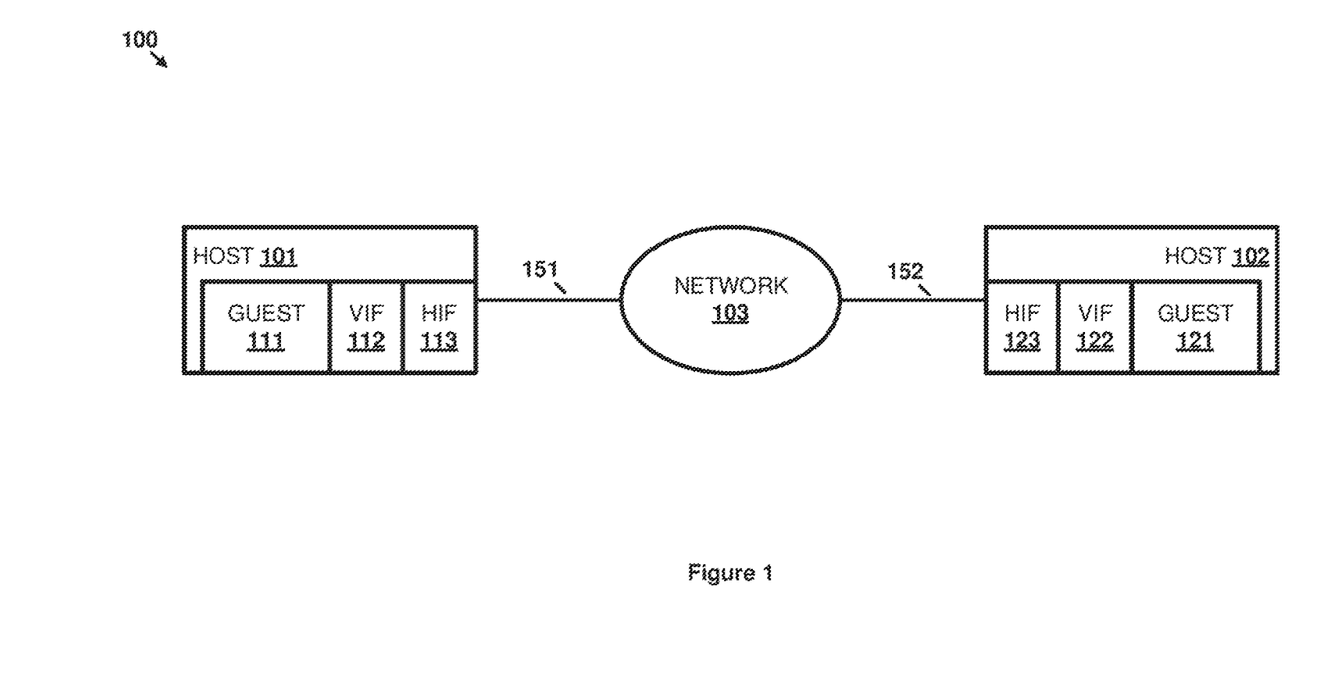
FIG. 1 illustrates an implementation for reducing secure protocol overhead when transferring packets between guest elements on different hosts.

FIG. 1 illustrates implementation 100 for reducing secure protocol overhead when transferring packets between guest elements on different hosts. implementation 100 includes host 101, host 102, and network 103. Host 101 hosts guest element 111, provides virtual network interface 112 to guest element 111, and provides host interface 113. Similarly, host 102 hosts guest element 121, provides virtual network interface 122 to guest element 121, and provides host interface 123. host 101 and host 102 communicate over communication links 151 and 152, respectively, through network 103. Host 101 and host 102 in this example each include hardware (e.g., microprocessor(s), memory, storage, etc.) and software (e.g., hypervisor) necessary to provide a virtualized computing system (e.g., virtual machine) on which guest element 111 and guest element 121, respectively, execute. Network 105 comprises a physical computer network between host 101 and host 102 and may include switches, routers, firewalls, or any other type of networking equipment—including combinations thereof. Similarly, host interface 113 and host interface 123 each comprise both the physical network interface of host 101 and host 102 and any logical interfaces implemented by host 101 and host 102 (e.g., an endpoint for a logical overlay network, such as a Virtual Extensible Local Area Network (VXLAN) Endpoint (VTEP) or a Geneve tunnel endpoint).

In operation, guest element 111 and guest element 121 are configured to exchange communications. Guest element 11 and guest element 121 may be guest operating systems executing within respective virtual machines on hosts 101 and 102, may be containerized applications, such as one implemented with Docker® technology available from Docker, Inc., on hosts 101 and 102, or may be some other type of virtualized computing element. The communications may be directed from host 101 to host 102, from host 102 to host 101, or may be some combination of both. Since the communications between guest element 111 and guest element 121 are also communications between hosts, security of those communications when outside the hosts is necessary to help prevent unwanted access to, or manipulation of, those communications. As such, host interface 113 and host interface 123 are configured to encapsulate communication packets using a secure protocol before transferring packets from their respective hosts. The host interface at the receiving end of the encapsulated packets can then remove the encapsulation. The secure protocol used by host interface 113 and host interface 123 uses stronger security than that used by the transport protocol used for the packets when they leave guest element 111 and guest element 121. As such, the elements of implementation 100 may rely on the protections of the secure protocol since it can be assumed that packets satisfying the protections of the secure protocol would also satisfy the protections of the less secure transport protocol.

Figure 2:
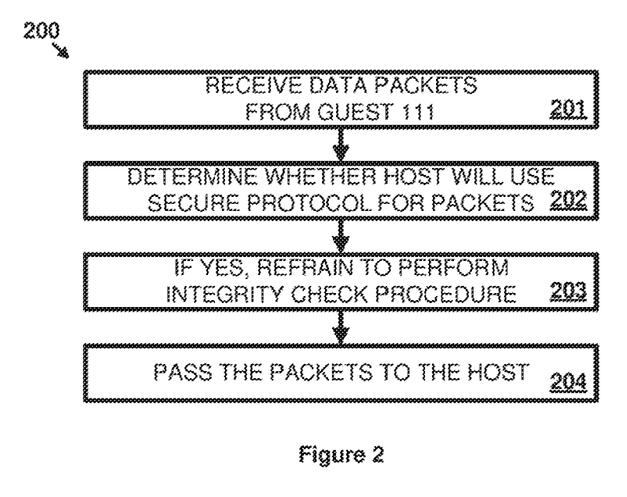
FIG. 2 illustrates a scenario for the implementation to reduce secure protocol overhead when transferring packets between guest elements on different hosts.

FIG. 2 illustrates scenario 200 for implementation 100 to reduce secure protocol overhead when transferring packets between guest elements on different hosts. This example describes communication traffic being transferred from guest element 111 to guest element 121, although, it should be understood that similar steps may be performed for traffic transferred in the opposite direction. In scenario 200, virtual network interface 112 receives one or more packets from guest element 111 directed to guest element 121 (201). The packets are formatted in a transport protocol for transfer over a communication network as virtual network interface 112 may be configured to perform if virtual network interface 112 was a physical interface rather than a virtualized interface provided by host 101. The transport protocol may be TCP, UDP, or some other transport protocol. Additionally, guest element 111 offloads the integrity check procedure of the transport protocol to virtual network interface 112. The integrity check procedure may include the calculation of an integrity checksum, such as a Cyclic Redundancy Check (CRC) calculation. While this offloading would conserve processing resources of host 101 if virtual network interface 112 was a physical interface, should virtual network interface 112 perform the transport protocol's integrity check, the processing resources of host 101 will still be used due to the virtualized nature of virtual network interface 112.

Upon receiving the packets, virtual network interface 112 determines whether the packets will be encapsulated in a secure protocol that provides an integrity check procedure for confirming the integrity of the packets at the receiver (202). The secure protocol may be IPsec, SSL, or some other type of secure protocol. Such secure protocols include an integrity check procedure, such as a procedure using a Hash-based message authentication code (HMAC) like HMAC-MD5 or HMAC-SHA256. In this example, virtual network interface 112 identifies guest element 121 as the destination for the packets and determines that the packets will be traveling between host 101 and host 102. Virtual network interface 112 further determines that communications between host 101 and host 102 are to be encapsulated by host interface 113 using a secure protocol having its own integrity check. The aforementioned determinations may be made by virtual network interface 112 referencing or querying a management or control plane of a virtual environment of which host 101 and host 102 are a part. Alternatively, virtual network interface 112 may reference or otherwise query host interface 113 to determine whether the packets will be transferred via a secure protocol. Communications between virtual network interface 112 and host interface 113 may be achieved by virtue of both interfaces being provided by host 101.

In response to determining that the secure protocol will be used on the packets, virtual network interface 112 refrains from performing the transmitter side portion of the transport protocol's integrity check procedure that guest element 111 offloaded to virtual network interface 112 (203). Alternatively, virtual network interface 112 had determined that a secure protocol will not be used on the packets, virtual network interface 112 would perform the transmitter side portion of the transport protocol's integrity check procedure. The procedure would be used in that case because there is no secure protocol upon which virtual network interface 112 can rely to ensure the integrity of the data packets during transfer.

Once virtual network interface 112 determines that it should refrain from performing the transport protocol's integrity check, virtual network interface 112 passes the packets to host 101 for delivery to host interface 113 (204). Host 101 and host interface 113 then handle the delivery of the packets over network 103 using the secure protocol. Advantageously, virtual network interface 112 can avoid using the processing resources of host 101 needed to perform the transport protocol's integrity check while still ensuring that the packets will get the benefit of another protocol's integrity check.

Figure 3:
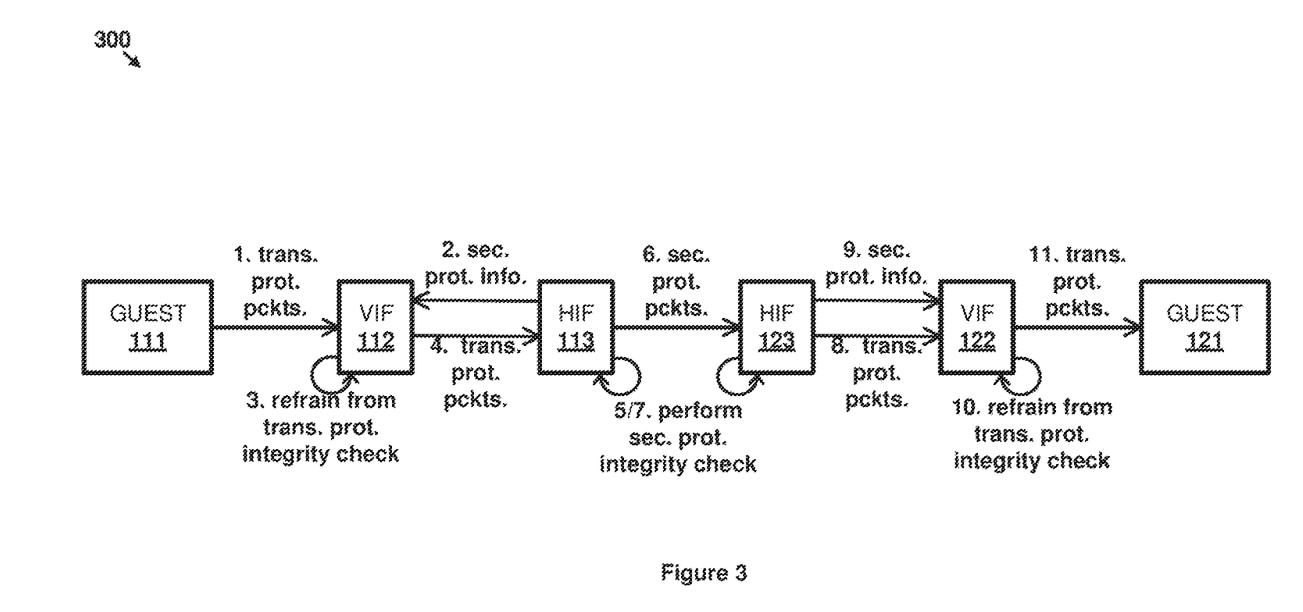
FIG. 3 illustrates another scenario for the implementation to reduce secure protocol overhead when transferring packets between guest elements on different hosts.

FIG. 3 illustrates scenario 300 for implementation 100 to reduce secure protocol overhead when transferring packets between guest elements on different hosts. scenario 300 tracks the progress of packets from their source in guest element 111 to their destination at guest element 121. As was the case with scenario 200, it should be understood that packets may be treated in a similar manner going in the reverse direction from guest element 121 to guest element 111. Although, in that direction, virtual network interface 122 would swap functions with virtual network interface 112 and host interface 123 would swap functions with host interface 113.

In scenario 300, packets are received by virtual network interface 112 at step 1 from guest element 111. The packets are passed to virtual network interface 112 using a transport protocol and guest element 111 is configured to offload any integrity check mechanism of the transport protocol to virtual network interface 112. Virtual network interface 112 determines that the packets in this case are going to be transferred using a secure protocol having its own integrity check, as indicated by secure protocol information received by virtual network interface 112 at step 2 from host interface 113. The secure protocol information indicates to virtual network interface 112 that at least the packets of this example will be transferred using the secure protocol. Although, the secure protocol may include information that pertains to other packets as well (e.g., information about all other hosts and/or guest elements running thereon with which communications are performed using the secure protocol). Host interface 113 may be queried for the secure protocol information or may provide the secure protocol information automatically. Likewise, while scenario 300 shows host interface 113 providing the secure protocol information directly to virtual network interface 112, the secure protocol information may be places elsewhere in host 101 for access by virtual network interface 112.

In this example, the secure protocol information indicates that the secure protocol will be used for the packets received from guest element 111 and virtual network interface 112 responsively refrains from performing the integrity check of the transport protocol at step 3, virtual network interface 112 then passes the packets in the transport protocol without the integrity check at step 4 to host interface 113. Upon receiving the packets, host interface 113 encapsulates the packets using the secure protocol and performs the transmit side portion of the secure protocol's integrity check procedure at step 5. The packets encapsulated using the secure protocol are transferred at step 6 from host interface 113 to host interface 123. While not shown, it should be understood that the encapsulated packets are transferred over network 103.

Upon receiving the encapsulated packets, host interface 123 removes the packets from the encapsulation and performs the receiver side portion of the secure protocol's integrity check at step 7. If the packets pass the secure protocol's integrity check, the packets are transferred from host interface 123 at step 8 to virtual network interface 122. virtual network interface 122 receives secure protocol information at step 9, which virtual network interface 122 uses to determine whether the secure protocol was used for transferring the received packets. The secure protocol information may be similar to and may be received in a manner similar to the secure protocol information received by virtual network interface 112 at step 2. Alternatively, host interface 123 may provide the secure protocol information along with the packets (e.g., transfer packets to virtual network interface 122 while also indicating that the packets being transferred already passed the secure protocol's integrity check, which may be implicit in the fact that the secure protocol was used and virtual network interface 122 received the packets). Of course, if the packets did not pass the secure protocol's integrity check, then the packets may not be transferred to virtual network interface 122.

Since the secure protocol information indicated that the packets were transferred using the secure protocol, virtual network interface 122 does not need to perform the receiver side portion of the transport protocol's integrity check procedure and refrains from doing so at step 10. The packets are then passed from virtual network interface 122 at step 11 to guest element 121. In some cases, guest element 121 may require some confirmation that the packets passed the transport protocol's integrity check at virtual network interface 122. In these examples, virtual network interface 122 may manipulate the packets in the transport protocol to provide guest element 121 with an indication that the transport protocol's integrity check authenticated the integrity of the packets even though that check was never performed. Thus, upon completion of scenario 300, the processing resources of both host 101 and host 102 are conserved by both virtual network interface 112 and virtual network interface 122 refraining from performing the transport protocol's integrity check procedure.

Figure 4:
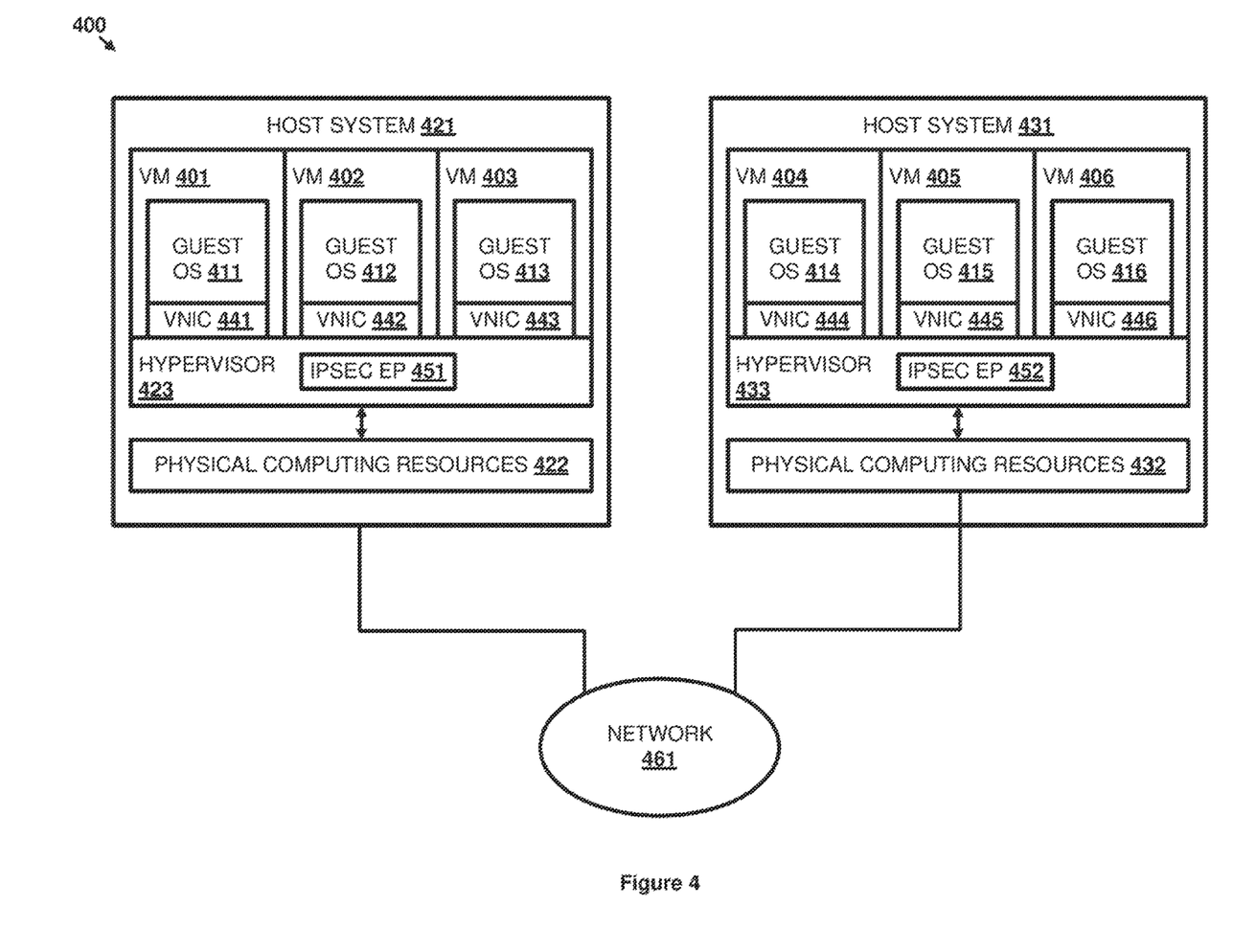
FIG. 4 illustrates another implementation for reducing secure protocol overhead when transferring packets between guest elements on different hosts.

FIG. 4 illustrates implementation 400 for reducing secure protocol overhead when transferring packets between guest elements on different hosts. Implementation 400 includes host computing system 421, host computing system 431, and network 461. Network 461 may include the Internet, one or more local area networks, one or more wide area networks, and/or one or more other types of networks between computing systems.

In this example, host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 and hypervisor 433 include IPsec endpoint 451 and IPsec endpoint 452, respectively. Additionally, hypervisor 423 provides one of VNICs 441-443 to each respective virtual machine 401-403 and hypervisor 433 provides one of VNICs 444-446 to each respective virtual machine 404-406. Guest operating systems (OSs) 411-416 executing within virtual machines 401-406 use the respective VNICs 441-446 to exchange network communications.

It should be understood that the distribution of virtual machines evenly across two host computing systems, as shown in FIG. 4, is merely exemplary. The six virtual machines shown may instead be implemented on any number of host computing systems from one to eight. Likewise, host computing systems 421 and 431 could host additional hosts (e.g., hypervisors) and virtual machines and/or other virtual elements that are not involved in this example.

Figure 5:
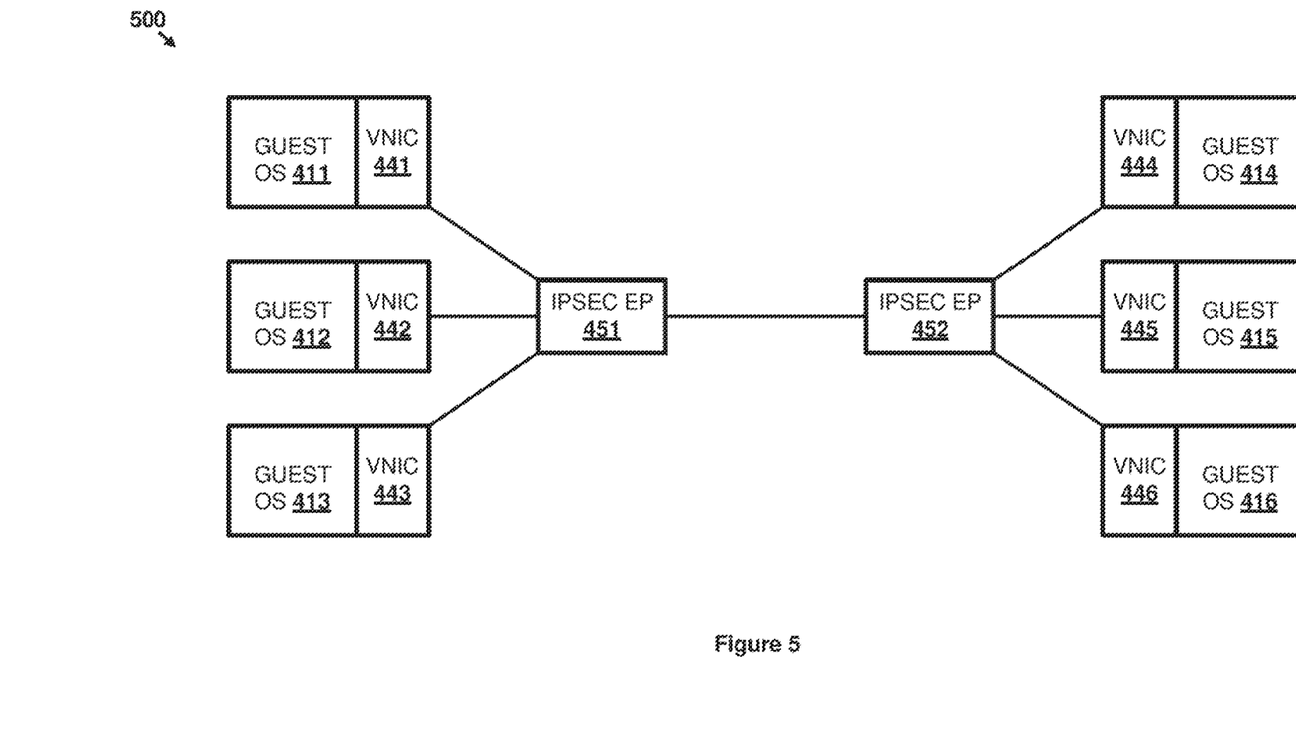
FIG. 5 illustrates a logical arrangement of the other implementation for reducing secure protocol overhead when transferring packets between guest elements on different hosts.

FIG. 5 illustrates logical arrangement 500 of implementation 400 for reducing secure protocol overhead when transferring packets between guest elements on different hosts. Logical arrangement 500 shows paths by which packet communications from each of guest OSs 411-413 are routed to guest OSs 414-416 and in the reverse direction. Packets pass from a guest OS to a VNIC and then to an IPsec endpoint. The IPsec endpoint then transfers the packets over network 461 to the other IPsec endpoint from which the packets are passed to the VNIC of the destination guest OS. The packets then enter the destination guest OS through that VNIC. While not shown, a virtual switch may be implemented by hypervisors 423 and 433 between their respective VNICs and IPsec endpoints. These virtual switches may handle packet routing between the VNICs and the IPsec endpoints while also handling communications between VNICs of the same host (e.g., packets transferred between VNIC 442 and VNIC 443).

Figure 6:
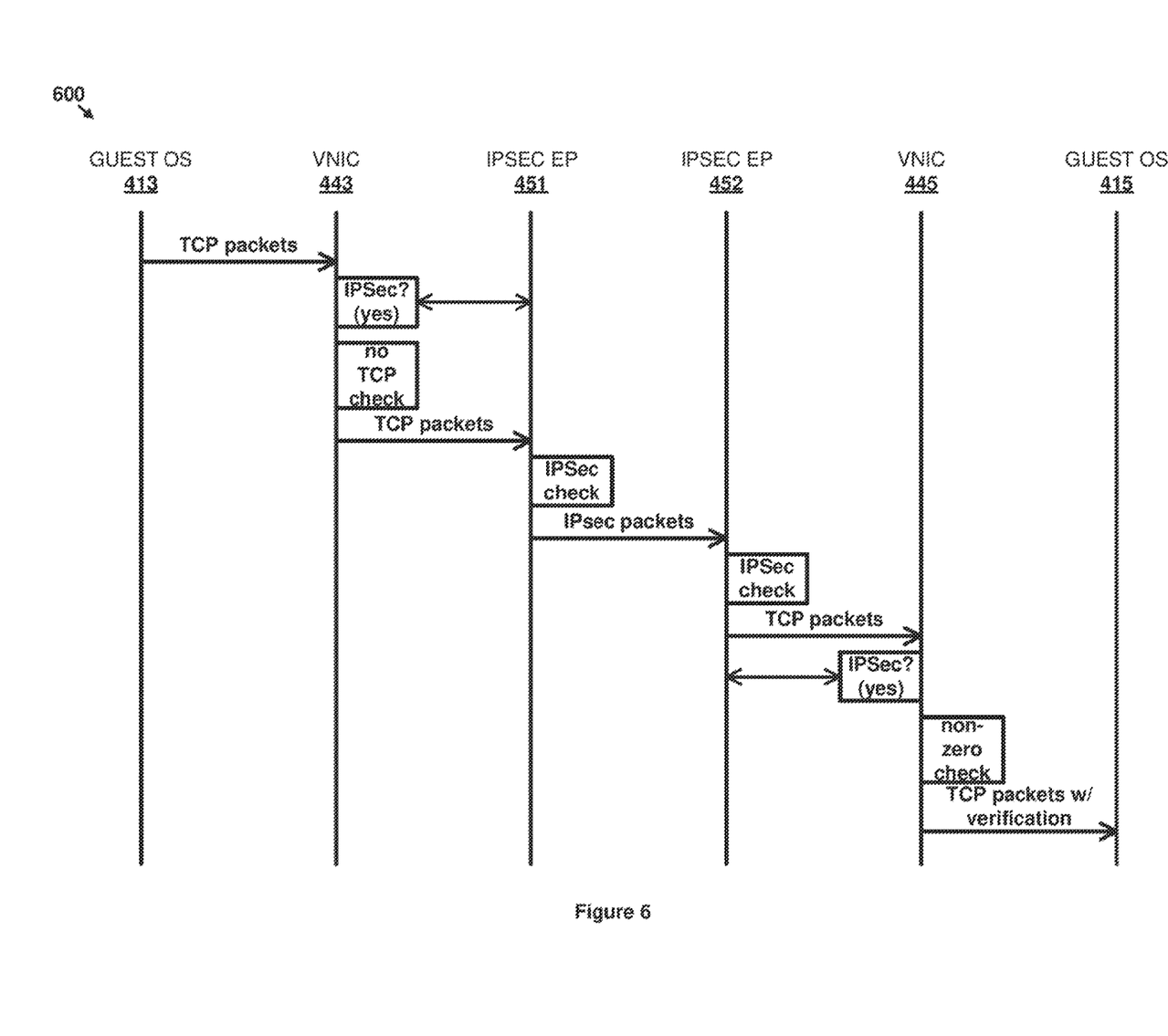
FIG. 6 illustrates a scenario for the other implementation to reduce secure protocol overhead when transferring packets between guest elements on different hosts.

FIG. 6 illustrates scenario 600 for implementation 400 to reduce secure protocol overhead when transferring packets between guest elements on different hosts. Scenario 600 describes a situation where packets are transferred from guest OS 413 to guest OS 415. The packets from guest OS 413 may be generated by an application executing within guest OS 413 and may be transferred to an application executing within guest OS 415. To transfer packets to guest OS 415, guest OS 413 formats the packets for transmission using TCP and passes the TCP packets to the network interface of virtual machine 403 in which guest OS 413 is executing. That network interface in this example is VNIC 443. TCP includes a checksum used to determine the integrity of the packets when received at a receiver. The calculation of this checksum is offloaded from guest OS 413 to VNIC 443, so guest OS 413 has not calculated the checksum for the TCP packets before the TCP packets are received in guest OS 413.

Instead of simply calculating the TCP checksum, VNIC 443 interfaces with IPsec endpoint 451 to determine whether the TCP packets will be transmitted using IPsec. VNIC 443 may provide IPsec endpoint 451 with destination information about the TCP packets so that IPsec endpoint 451 can determine whether the destination of the TCP packets is on a host with which IPsec endpoint 451 communicates. In this example, the TCP packets are destined for guest OS 415 and IPsec endpoint 451 communicates with IPsec endpoint 452. Therefore, an IPsec tunnel exists between IPsec endpoint 451 and IPsec endpoint 452 through which the TCP packets will be sent. In response to determining that the TCP packets will be sent over an IPsec tunnel, VNIC 443 refrains from performing the TCP checksum calculation that guest OS 413 expected VNIC 443 to perform. The TCP packets are then transferred to IPsec endpoint 451 without the checksum.

Upon receiving the packets. IPsec endpoint 451 encapsulates the TCP packets for transfer to IPsec endpoint 452 in an IPsec tunnel. IPsec endpoint 451 further performs any integrity check procedure provided for by IPsec before transferring the IPsec encapsulated packets to IPsec endpoint 452. Upon receiving the IPsec encapsulated packets. IPsec endpoint 452 performs its own integrity check procedure provided by IPsec to ensure the integrity of the packets has not been compromised during transfer from IPsec endpoint 451. If the integrity of the encapsulated packets remains intact, IPsec endpoint 452 unencapsulates the packets, which results in the original TCP packets discussed above. Those TCP packets are passed to VNIC 445 as the VNIC of guest OS 415, which is the destination for the TCP packets.

VNIC 445 then interfaces with IPsec endpoint 452 to determine whether the TCP packets were transferred to IPsec endpoint 452 and that their integrity was confirmed using IPsec's integrity check. In some examples, this interfacing may be implicit in the fact that VNIC 445 received the TCP packets from an IPsec endpoint. That is, the IPsec endpoint would not have passed the TCP packets to VNIC 445 if they did not pass IPsec's integrity check and the fact that the TCP packets were received from an IPsec endpoint indicates that IPsec was used for transferring the TCP packets between hosts.

Responsive to determining that the TCP packets were transferred using IPsec and passed the IPsec integrity check, VNIC 445 refrains from calculating a checksum for the integrity check procedure provided by TCP. However, since the performance of TCP's integrity check has been offloaded to VNIC 445 by guest OS 415, VNIC 445 must provide guest OS 415 with an indication that the integrity of the TCP packets was confirmed, otherwise guest OS 415 may not accept the TCP packets. Accordingly, VNIC 445 places a non-zero value in the checksum field of the TCP packets to indicate that the integrity of the TCP packets has been verified before passing those TCP packets to guest OS 415.

Guest OS 415 can then recognize the non-zero value in the checksum field of the TCP packets and assume that VNIC 445 validated the integrity of the TCP packets as expected.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of reducing overhead for packet communications between guest elements executing on different hosts, the method comprising:
   in a first virtual network interface of a first guest element executing on a first host:
      receiving one or more first packets from the first guest element directed to a second guest element executing on a second host;
      in response to determining that the first packets will be encapsulated in a secure protocol having a first integrity check procedure provided for by the secure protocol after passing from the first virtual network interface, refraining to perform a transmit-side portion of a second integrity check procedure on the first packets as provided for by a transport protocol; and
      passing the first packets to the first host of the first virtual network interface in the transport protocol.

2. The method of claim 1, further comprising:
   in the first host, encapsulating the first packets in the secure protocol and performing a transmit-side portion of the first integrity check procedure.

3. The method of claim 1, further comprising:
   in a second virtual network interface of the second guest element:
      receiving the first packets from a second host of the second virtual network interface;
      in response to determining that the first packets were encapsulated in the secure protocol, refraining to perform a receiver-side portion of the second integrity check procedure; and
      passing the first packets to the second guest element.

4. The method of claim 3, further comprising:
   in the second host, un-encapsulating the first packets and performing the receiver-side portion of the first integrity check procedure; and
   passing the first packets to the second virtual network interface when the receiver-side portion of the first integrity check procedure verifies the first packets.

5. The method of claim 3, wherein refraining to perform a receiver-side portion of the second integrity check procedure comprises:
   inserting a non-zero placeholder value into a checksum field of the first packets in the transport protocol; and
   indicating to the second guest element that the receiver-side portion of the second integrity check procedure verified the first packets.

6. The method of claim 5, wherein the second guest element receives the first packets from the second virtual network interface and handles the first packets as packets that were verified by the receiver-side portion of the second integrity check procedure.

7. The method of claim 5, wherein the second integrity check procedure comprises a Cyclic Redundancy Check (CRC) procedure and the checksum field comprises a field designated for a CRC.

8. The method of claim 1, further comprising:
   in the first virtual network interface:
      receiving one or more second packets from the first guest element;
      in response to determining that the second packets will not be encapsulated in the secure protocol, performing the transmit-side portion of the second integrity check procedure on the second packets; and
      passing the second packets to the first host in the transport protocol.

9. The method of claim 1, wherein the secure protocol comprises one protocol of a group including Secure Sockets Layer (SSL) and Internet Protocol Security (IPSec).

10. The method of claim 1, wherein the transport protocol comprises one protocol of a group including Transmission Control Protocol (TCP) and User Datagram Protocol.

11. A system for reducing overhead for packet communications between guest elements executing on different hosts, the system comprising:
    one or more computer readable storage media;
    a processing system, comprising processing circuitry, coupled with the one or more computer readable storage media; and
    program instructions stored on the one or more computer readable storage media that, when read and executed by the processing system, direct the processing system to:
       provide a first virtual network interface of a first guest element;
       provide a first host of the first guest element and the first virtual network interface;
       in the first virtual network interface:
          receive one or more first packets from the first guest element directed to a second guest element executing on a second host;
          in response to determining that the first packets will be encapsulated in a secure protocol having a first integrity check procedure provided for by the secure protocol after passing from the first virtual network interface, refrain to perform a transmit-side portion of a second integrity check procedure on the first packets as provided for by a transport protocol; and
          pass the first packets to the first host in the transport protocol.

12. The system of claim 11, wherein the program instructions further direct the processing system to:
    in the first host, encapsulate the first packets in the secure protocol and perform a transmit-side portion of the first integrity check procedure.

13. The system of claim 11, wherein the program instructions further direct the processing system to:
    in the first virtual network interface:
       receive one or more second packets from the first guest element;
       in response to determining that the second packets will not be encapsulated in the secure protocol, perform the transmit-side portion of the second integrity check procedure on the second packets; and
       pass the second packets to the first host in the transport protocol.

14. The system of claim 11, wherein the secure protocol comprises one protocol of a group including Secure Sockets Layer (SSL) and Internet Protocol Security (IPSec).

15. The system of claim 11, wherein the transport protocol comprises one protocol of a group including Transmission Control Protocol (TCP) and User Datagram Protocol.

16. A system for reducing overhead for packet communications between guest elements executing on different hosts, the system comprising:
   one or more computer readable storage media;
   a processing system, comprising processing circuitry, coupled with the one or more computer readable storage media; and
   program instructions stored on the one or more computer readable storage media that, when read and executed by the processing system, direct the processing system to:
      provide a second virtual network interface of a second guest element;
      provide a second host of the second guest element and the second virtual network interface;
      in the second virtual network interface:
         receive one or more first packets from the second host, wherein the first packets were directed from a first guest element executing on a first host to the second guest element;
         in response to determining that the first packets were encapsulated in a secure protocol having a first integrity check procedure provided for by the secure protocol before being received from the second host, refrain to perform a receiver-side portion of a second integrity check procedure on the first packets as provided for by a transport protocol; and
         passing the first packets to the second guest element.

17. The system of claim 16, wherein the program instructions further direct the processing system to:
   in the second host, un-encapsulate the first packets and perform a receiver-side portion of a first integrity check procedure provided for by the secure protocol; and
   pass the first packets to the second virtual network interface when the receiver-side portion of the first integrity check procedure verifies the first packets.

18. The system of claim 16, wherein to refrain to perform a receiver-side portion of the second integrity check procedure, the program instructions direct the processing system to:
   insert a non-zero placeholder value into a checksum field of the first packets in the transport protocol; and
   indicate to the second guest element that the receiver-side portion of the second integrity check procedure verified the first packets.

19. The system of claim 18, wherein the second guest element receives the first packets from the second virtual network interface and handles the first packets as packets that were verified by the receiver-side portion of the second integrity check procedure.

20. The system of claim 18, wherein the second integrity check procedure comprises a Cyclic Redundancy Check (CRC) procedure and the checksum field comprises a field designated for a CRC.

* * * * *